Inventor:
EMILE CLAVEAU

Nov. 7, 1967  E. CLAVEAU  3,351,157
BRAKE SYSTEMS FOR MOTOR VEHICLES
Filed Dec. 23, 1965  5 Sheets-Sheet 3
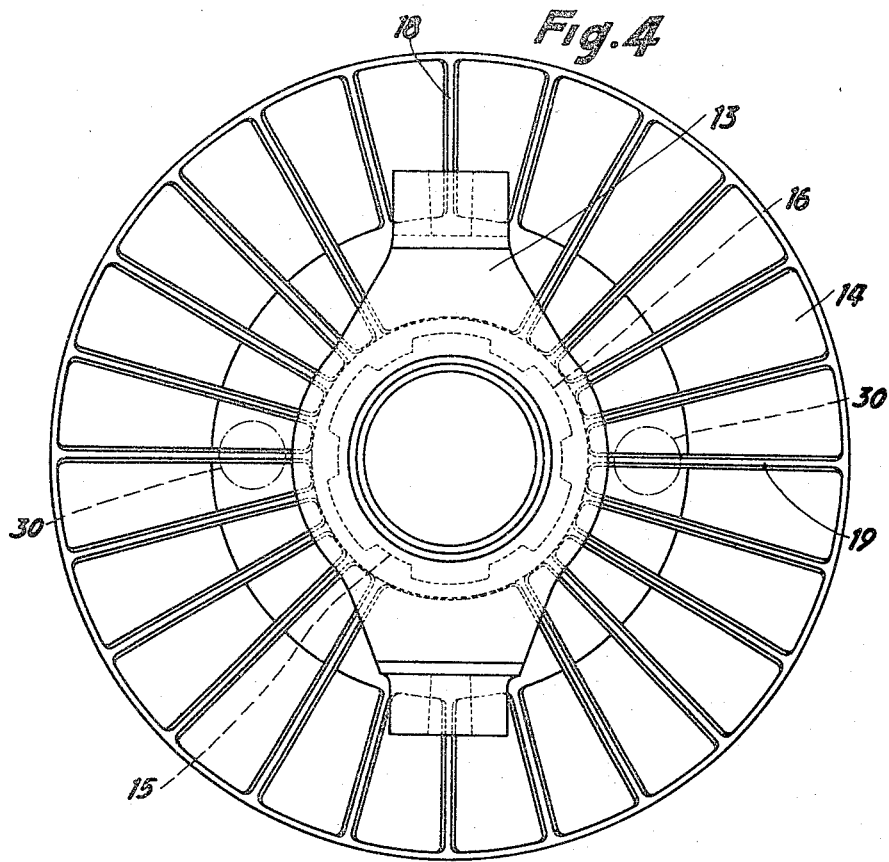
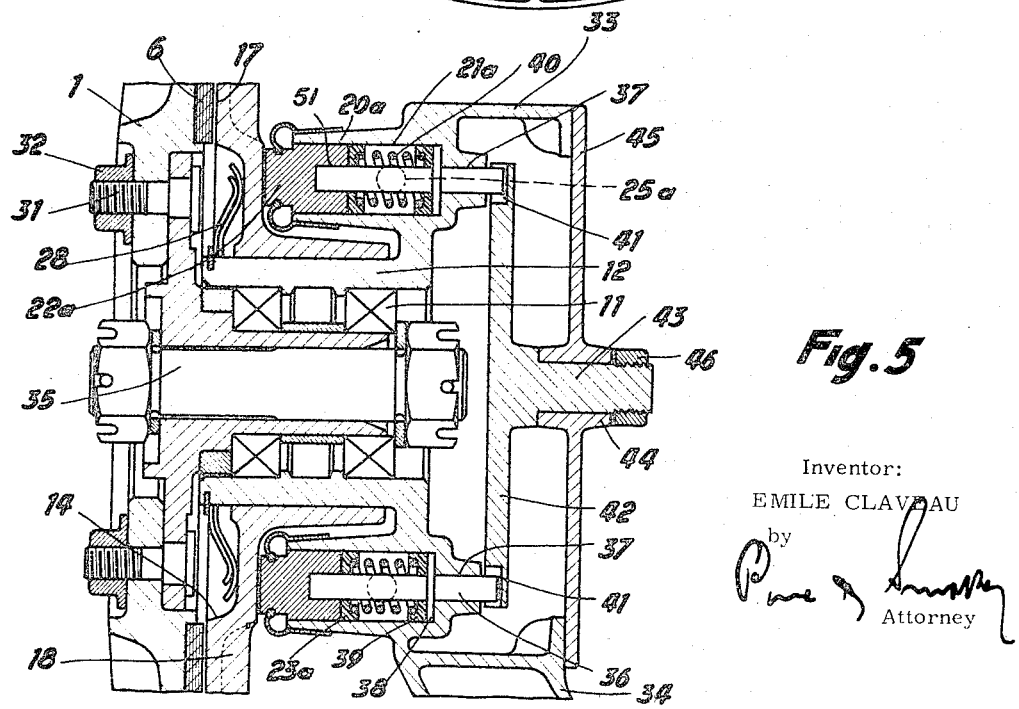
Inventor:
EMILE CLAVEAU
by
Attorney Nov. 7, 1967 E. CLAVEAU 3,351,157
BRAKE SYSTEMS FOR MOTOR VEHICLES
Filed Dec. 23, 1965 5 Sheets-Sheet 4

Inventor:
EMILE CLAVEAU
by
Attorney

Inventor:
EMILE CLAVEAU

United States Patent Office 3,351,157
Patented Nov. 7, 1967

3,351,157
BRAKE SYSTEMS FOR MOTOR VEHICLES
Emile Claveau, 11 Rue Christiani, Paris, Seine, France
Filed Dec. 23, 1965, Ser. No. 516,044
5 Claims. (Cl. 188—18)

The present invention relates to brake systems for motor vehicles.

Existing brake systems make use of brake drums or disc brakes. In drum brakes, a drum is secured to the wheel hub and contains two substantially semicircular segments or shoes provided with friction linings, the segments being carried by a fixed plate secured to the member supporting the wheel, which may for example be an axle or a suspension arm. The two segments are articulated at one end to a fixed point on the plate, and at their other ends are urged towards one another by a return spring by which they are held in contact with push-rods acting in opposite directions under the pressure exerted by hydraulic braking fluid. Despite improvements in this type of brake, the latter do not give complete satisfaction because cooling, which is necessary for their good operation, is difficult while, in addition, the necessity to improve the power of the brakes by increasing the friction surface between shoes and drum necessitates a considerable increase in size and consequently in weight.

Brakes of the disc type which have more recently been introduced give improved braking performance but although they are lighter than drum brakes for the same power, they still have the disadvantage of poor cooling, which results from the need to enclose the braking means in more or less closed casings, in order to protect them from mud and wet.

The present invention has for its object a braking device which substantially increases the ability to cool the braking members and which considerably reduces their weight.

The device according to the invention is constituted by a wheel-brake assembly having two co-operating annular friction surfaces, one of which is carried directly by the inner face of the wheel while the other is carried by a plate member mounting for sliding movement but incapable of rotation on the suspension member carrying the wheel, said plate being subjected to the action of push-rods secured to plungers moving in cylinders connected to a hydraulic brake fluid circuit and carried by said wheel carrying member, which the push-rods operate to apply the plate against the wheel under the action of the braking fluid and against the action of return springs.

The co-operating friction surfaces may be constituted respectively by brake linings or arcuate form and forming together an annular crown concentric to the wheel axis, said linings being fastened to the latter, and by a straightened annular surface machined on the plate member opposite said linings.

In an alternative arrangement, the linings which are of arcuate shape, and which may if desired be replaced by a one-piece crown-shaped lining, may be carried by the plate while a straightened annular surface is provided on the wheel opposite said linings. This straightened annular surface may be constituted either by an attached part of cast iron secured to the wheel, which is then composed of a light alloy, for example an aluminium based alloy, or else machined directly on the wheel or on the plate, which are then of cast iron.

The outer face of the wheel and the face of the plate member opposite to its friction surface are advantageously provided with cooling fins.

The cylinders controlling the push-rods acting on the plate may be machined directly in the wheel carrier member, which may for example be a wheel pivot in the case of a front wheel, or an axial or the terminal portion of the suspension arm in the case of a rear wheel.

It will be realised that as the result of this invention, it is possible to provide a braking device having a very large friction surface but comprising a small number of parts as compared with existing forms of brake. Moreover, while said parts nevertheless have a relatively large cooling surface, the opposite face of the plate member to its operative surface and of course, the outer face of the wheel are in direct contact with the atmosphere.

Cooling conditions may be still further improved by providing centrally of the plate member one or more openings for admission of air, which on rotation of the wheel, is entrained towards the periphery of the plate by centrifugal force and escapes by passing between the co-operating friction surfaces on the plate and the wheel.

Circulation of air also operates to reduce penetration of mud or dust between the plate and the wheel, thus eliminating the need for additional protective devices.

The opening or openings provided in the plate may for this purpose be connected to an air inlet supply passage, the inlet to which can be placed on the vehicle in a position where it is protected from ingress of dirt. The inlet to the air supply passage or passages may advantageously be at the front of the vehicle so that the air entering the same is brought to a space between the plate and the wheel under slight atmospheric pressure.

The circulation of air may be still further improved by providing the inner face of the wheel hub collar with radial fins which function as a centrifugal fan.

To enable the brake device according to the invention to be operated manually, particularly when it is mounted on a rear wheel of the vehicle the plunger of each cylinder receiving the brake fluid may incorporate an axially displaceable rod, which extends through the opposite end of the cylinder, the rod having thereon a collar provided with a sealing packing in order to enclose between it and the rear face of the plunger a chamber, which remains of constant volume during the displacement of the rod. Means is also provided to effect displacement of the rod in a direction to apply the plate against the wheel when the hand-brake control is actuated. For this purpose the rods may project outwardly from the inner face of the wheel carrier member in which the cylinders are provided, their free end co-operating with cams, rising surfaces, or movable push-rods operated by the hand-brake control.

Two embodiments of the invention, one relating to a front wheel brake and the other to a rear wheel brake, are described below with reference to the accompanying drawings, in which:

FIGURE 4 is a front elevation of the wheel pivot and of the brake plate viewed in the direction of the arrow IV in FIGURE 1;

FIGURE 5 is a part horizontal section of a rear wheel of the same vehicle, provided with a brake device according to the invention and having means for operating it under control of the hand-brake;

Figure 1:
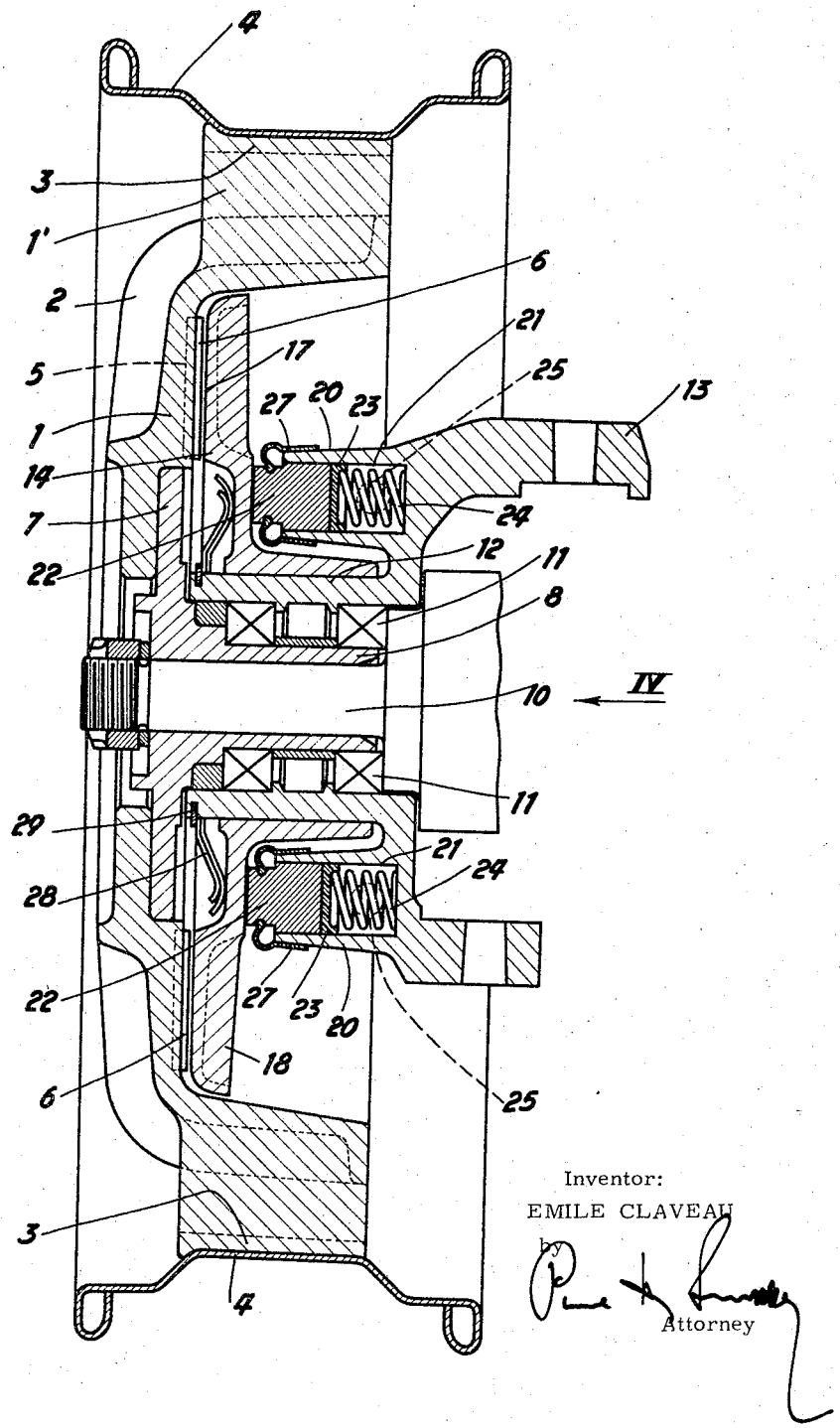
FIGURE 1 is a vertical section of a front wheel of a front wheel drive automobile vehicle equipped with a braking device according to the invention.
Figure 3:
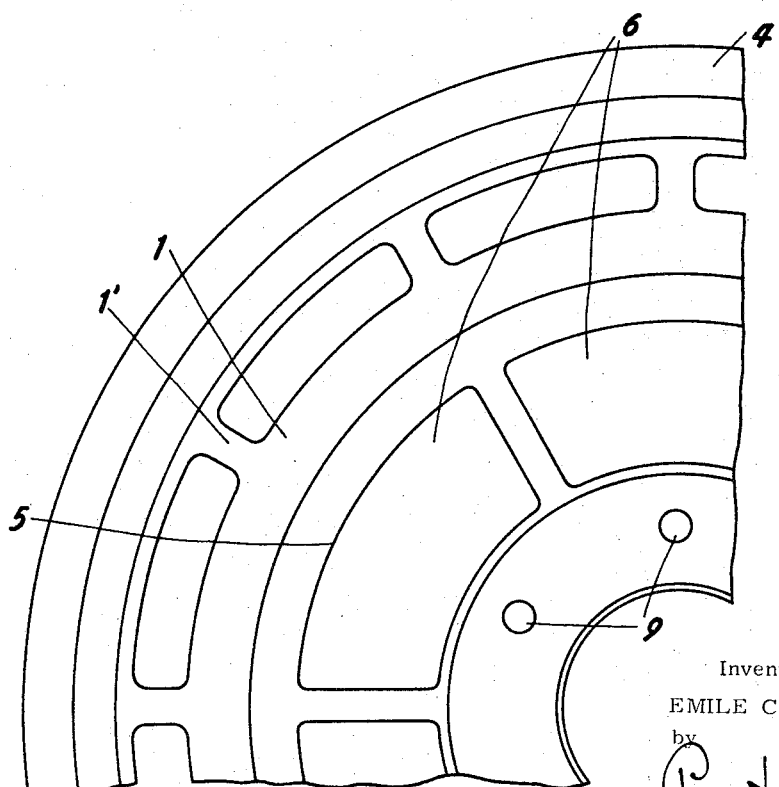
FIGURE 3 is a part elevation of the inside face of the wheel.

Referring to FIGURE 1, there is shown a front wheel suitable for a front wheel driven automobile, the wheel comprising a disc 1 having spokes 1' provided with outer radial ribs 2 united by an annulus 3, the whole arrangement being formed as a casting in lightweight metal. To the periphery of the annulus 3 is secured a rim 4 of the required profile. On the inside face of the disc 1 are cavities 5 (FIGURES 1 and 3) conforming to an arc of a circle concentric to the wheel axis in which are embedded friction linings 6 of corresponding shape.

Figure 2:
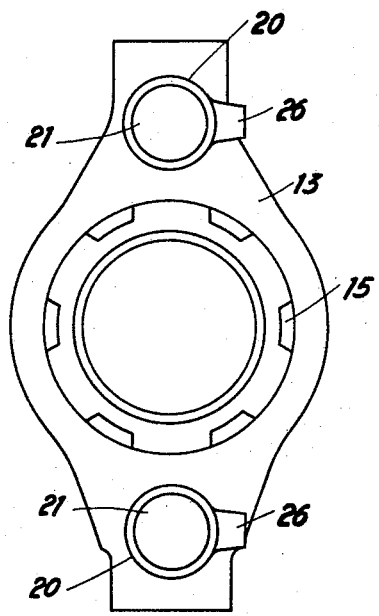
FIGURE 2 is a front view of the pivot of said wheel.

The wheel thus constituted is mounted in conventional manner on the flange 7 of a hub 8, by means of threaded bolts (not shown) carried by the flange 7 and engaging in holes 9 (FIGURE 3) provided in the wheel disc and secured in position by lock nuts. The hub 8 is keyed to the driving spindle 10, keyways being provided in both parts. In addition, the hub 8 carried bearings 11 by which the hub 8 is rotatably supported in a sleeve 12 forming part of the wheel steering pivot 13. A brake plate member 14 is mounted on the sleeve 12 for axially sliding movements on the latter, rotation in relation to said sleeve being prevented by grooves 15, 16 provided respectively in the two parts (FIGURES 2 and 4).

The plate 14, which is of cast iron, has a flat annular surface 17 adapted to co-operate with the friction linings 6 in the wheels, its opposite face being provided with radial cooling fins 18, 19. The wheel pivot 13 has two socket like extensions 20 of slightly truncated conical shape which project axially outwards towards the plate 14, each socket having a cylindrical bore 21. Mounted in each of these cylinders 21 is a piston 22 provided on its inner end face with a seal 23, each piston being urged outwardly by a coil spring 24. In each cylinder 21, behind the piston 22, is a laterally projecting boss 26, through which extends a duct 25 for connection to the hydraulic brake circuit of the vehicle.

Flexible sealing collars 27 are fastened to the outer end of the pistons 22 and engage over the sockets 20 to prevent ingress of dirt to the cylinders 21 and pistons 22.

The plate 14 is permanently applied against the heads of the pistons 22 by means of a pair of star-shaped springs 28 carried by the sleeve 12 and held in position by a circlip 29, the strength of these springs being greater than that of the coil springs 24. When braking, the hydraulic pressure acting on the inner face of the pistons 22 through the medium of the seals 23 tends to force the pistons outwardly against the brake plate 14, thereby causing its surface 17 to enter into frictional contact with the linings 6 on the inside face of the wheel.

Braking can thus be effected under optimum conditions as regards the cooling of all the brake members, which likewise have the benefit of a large friction surface. On release of the brake fluid pressure, the springs 28 move the plate 14 out of engagement with the linings 6. Cooling of the brake members, which is promoted not only by the relatively slight mass of the co-operating members which are directly exposed to atmosphere, but also by the presence of the cooling fins, can be further improved by providing in the plate 14, apertures 30 shown in chain-dotted lines in FIGURE 4, the ribs 19 opposite the apertures 30 being reduced in length like the ribs 18. These apertures 30 enable air to enter the space between the plate 14 and the wheel, circulation of which air is set up by centrifugal force causing it to escape between the plate 14 and the linings 6, this flow of air helping to prevent penetration of water and dirt between the plate and linings.

Instead of leaving the apertures 30 open to atmosphere, they may be connected to an air supply circuit the other end of which has its opening at a point where it is protected from water and dirt, which point if facing towards the front of the vehicle ensures slight atmospheric pressure.

Figure 10:
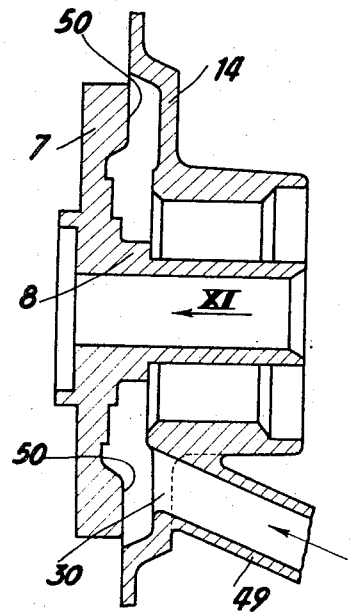
FIGURE 10 is a part horizontal section of an alternative construction for the brake plate and wheel hub.
Figure 11:
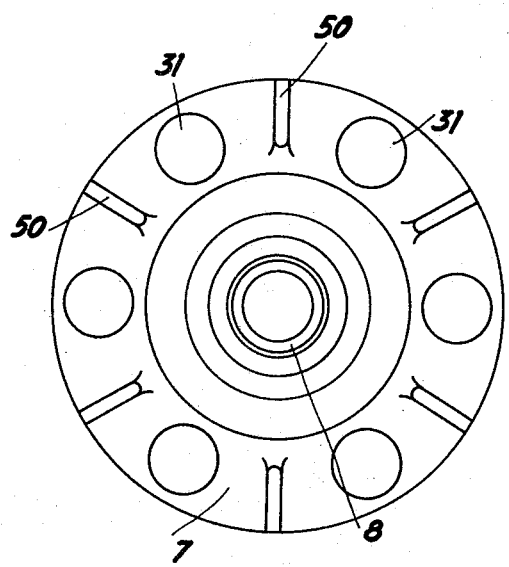
FIGURE 11 is an elevation of the hub shown in FIGURE 10, viewed in the direction of the arrow XI in FIGURE 10.

The circulation of cooling air between the wheel and the brake plate may be further increased by providing, on the rear face of the hub collar, radial blades which operate as a centrifugal fan, as described below in connection with FIGURES 10 and 11.

Figure 6:
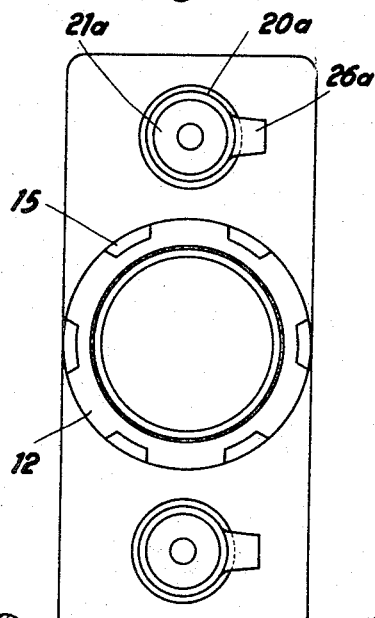
FIGURE 6 is a part front view of a member carrying the above mentioned rear wheel, the longitudinal axis of said member being turned through 90°.
Figure 7:
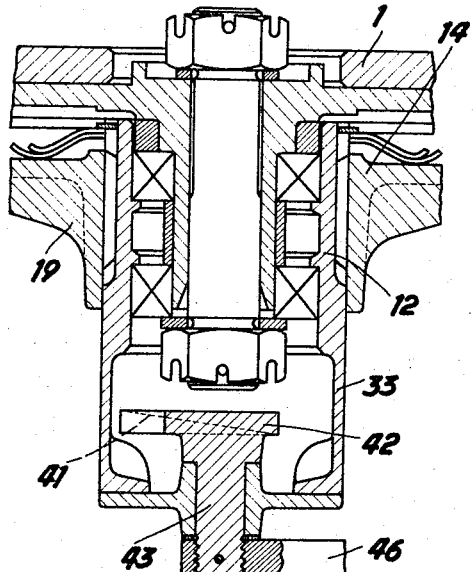
FIGURE 7 is a part diametrical vertical section of the arrangement illustrated in FIGURE 5.

Referring now to FIGURES 5 to 7 there is shown a braking device suitable for use on a non-driven rear wheel, the same basic elements being designated by the same reference numerals, thus the wheel disc is indicated at 1, the brake linings at 6 and a plate 14 slidably mounted on a sleeve 12 and held away from the lining 6 by star-shaped springs 28. In FIGURE 5, the wheel is secured by bolts 31 and nuts 32. However, in this case the sleeve 12 forms part of a rear wheel support 33 mounted in known manner on a swinging arm 34. A pin 35 holds the hub and the bearings 11 which support it on the sleeve 12.

As in the previous arrangement, the wheel carrying member has two slightly truncated conical sockets or extensions 20a, in each of which is a cylinder 21a for a plunger 22a by which the annular surface 17 of plate 14 can be moved into engagement with the lining 6 by hydraulic pressure, the brake fluid entering the cylinders 21a through apertures 25a in bosses 26a.

To enable the rear brake to be applied by the handbrake control, which must be independent of the hydraulic brake circuit, the plungers 22a are in this case freely mounted on one end of a rod 36, which extends through a bore 37 in the wheel support member 33. The plunger 22a is provided with a blind bore 51 extending from the inner face of plunger 22a into the body thereof and is adapted to receive in a nesting relationship one end of push rod 36. On the rod 36 is a collar 38 on which is supported a seal 39, which together with the seal 23a of the plunger 22a, enclosed, the free space within the cylinder 21a, the two seals 23a and 39 being held apart by a coil spring 40, the spring 40 tending on the one hand to push the plunger 22a forwardly and outwardly of cylinder 21a and on the other hand to apply the collar 38 of the rod 36 against the bottom of the cylinder, thereby causing the rear end of the rod 36 to project from the rear face of the wheel support member 33. The length of the cylinders 21a is such that the volume of the free space or chamber enclosed between the seals 23a and 39, taking into account the presence in that chamber of the rod 36, will be equal to the volume of the free space or chamber of the cylinders 21 of the front wheels, in order to ensure balancing of the braking between the front and rear wheels.

The outer ends of rods 36 bear respectively against circumferentially extending rising surfaces 41, arranged to conform to an arc of a circle which are provided at opposite ends of a bar 42 fast on a spindle 43 rotatably mounted in a bearing 44 provided in the cover plate 45 of the wheel carrier member 33, which is shaped for the purpose. Application of the hand brake is effected by means of a lever 46 keyed to the outer end of spindle 43.

The inclined faces or cams 41 are so disposed that on displacement of the lever 46 from the rear towards the front in FIGURE 7, which results in a corresponding rotation of the shaft 43, the cams 41 displace the rods 36 in an axial direction and thus move the plungers 22a outwardly of the cylinders 21a to bring the plate 14 into contact with the linings 7. By reason however of the lost motion connection between rods 36 and their respective plungers, movement of the latter to actuate the brake is possible without disturbing the hand control gear.

Because of the presence of the collar 38 and of the seal 39 on each rod 36, the volume of the chamber of the cylinder 21a remains the same during this movement.

Figure 8:
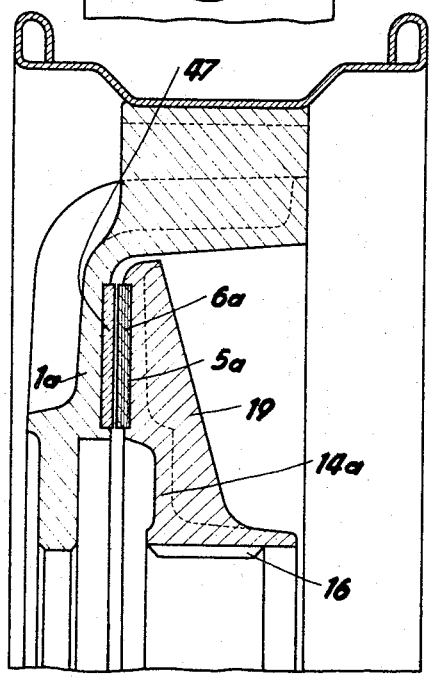
FIGURES 8 and 9 are vertical sections of two alternative designs of a wheel and of a brake plate for co-operation therewith.
Figure 9:
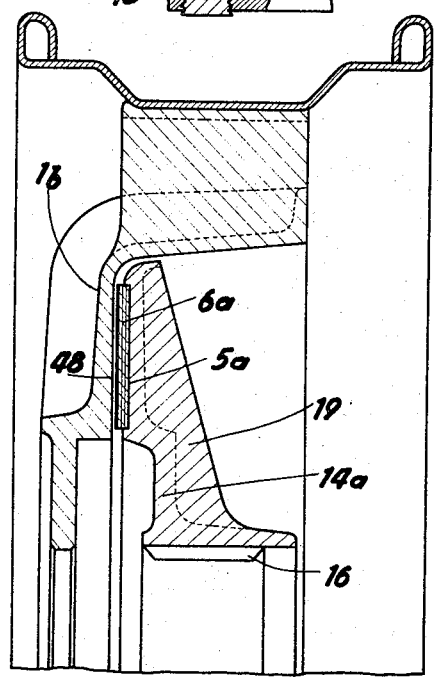

In the embodiments in FIGURES 1–5 and 6 and 7, the linings 6 are carried by the wheels and co-operate with the annular surface 17 on the plates 14. It will be realised that this arrangement may be reversed, as shown in FIGURES 8 and 9, in which the arcuate linings are replaced by a crown-shaped lining 6a, secured in a corresponding groove 5a in the plate 14a. In FIGURE 8, the lining 6a co-operates with a cast iron crown or track 47 inserted in the disc 1a of the light alloy wheel, the connection between the crown 47 and disc 1a being made by means known in the light alloy industry. In FIGURE 9, the linings 6a co-operate directly with a straightened annular surface 48 on the disc 1b of the wheel, which in that case is of cast iron.

As mentioned above, cooling of the brake members may be increased by admission of air through the brake plate and in addition providing the inner face of the hub collar with fins capabe of setting up a fan effect. An alternative arrangement is shown in FIGURES 10 and 11.

As previously mentioned, plate 14 has an air inlet 30 having a connection nozzle 49 for connection to an air supply.

The rear face of the collar 7 of the hub 8 is provided on its periphery with regularly spaced radial fins 50, which fins, due to their centrifugal fan action, will add to the centrifugal force of the wheel in order to accelerate circulation of air from the aperture 30 and spread it over the entire periphery of the brake plate at the same time driving it between the latter and the wheel disc to the outside.

I claim:
1. A wheel and brake assembly particularly for motor vehicles and of the type including a wheel having an inner and an outer face, a stationary supporting member rotatably supporting said wheel, a first annular friction surface on the inner face of said wheel, a pressure plate member non-rotatably but slidingly mounted on said stationary supporting member for movement towards and away from said inner face of said wheel, a second annular friction surface on said pressure plate member for frictional engagement with said first annular friction surface, spring means urging said pressure plate member away from said wheel, actuating means urging said pressure plate member towards said wheel against the force of said spring means for frictional engagement between said first and second friction surfaces, the improvement in said actuating means comprising,

(A) A plurality of cylinders carried by said supporting member, each cylinder having
  (1) a longitudinal axis substantially perpendicular to said plate member,
  (2) an open end facing said pressure plate member,
  (3) an opposite end axially spaced from said open end,
  (4) an axial open-ended bore contained in said opposite end and extending through said wheel supporting member,
(B) a plunger slidable in each of said cylinders and having
  (1) an outer head portion protruding through said open end to abut against said pressure plate member,
  (2) a body portion disposed in said cylinder and provided with a blind bore extending in the direction of said longitudinal axis,
(C) a push rod slidable in said axial bore and having
  (1) one end nesting in said blind bore of said plunger and
  (2) an opposite end projecting through said axial bore,
(D) means for feeding pressure fluid to each of said cylinders,
(E) sealing means surrounding said push rod for preventing leakage of said pressure fluid through said axial bore, said plunger urging said pressure plate member towards said wheel into a braking position when a hydraulic pressure is applied to said cylinders through said means for feeding pressure fluid thereinto, and
(F) hand brake controlled mechanical means for applying a force through said push rod to said plunger for urging said pressure plate member towards said wheel into a braking position independently of said hydraulic pressure.

2. An assembly as defined in claim 1, wherein said sealing means fills the entire cross-section of said cylinder about said push rod and, upon actuation of said mechanical means, is adapted to move with said push rod as a unit to maintain constant the volume in said cylinder between said sealing means and said plunger when said push rod is displaced upon actuation of said mechanical means.

3. An assembly as defined in claim 2, including a collar rigidly affixed to said push rod between said sealing means and said axial bore to carry said sealing means with said push rod as a unit upon actuation of said mechanical means.

4. An assembly as defined in claim 3, including a spring disposed between said plunger and said collar to urge said sealing means against said collar and away from said plunger.

5. An assembly as defined in claim 4, wherein said mechanical actuating means includes a rod disposed adjacent said opposite end of said push rod and extending in a plane normal to said longitudinal axis, said rod rotatable about an axis parallel to said longitudinal axis, and provided with a cam face engaging said push rod and urging the same into said cylinder when said rod is rotated.

References Cited
UNITED STATES PATENTS

| | | | |
|---|---|---|---|
| 2,672,220 | 3/1954 | Collier | 188—18 |
| 2,742,107 | 4/1956 | Du Bois | 188—18 |
| 2,856,038 | 10/1958 | Busch | 188—264 X |
| 3,048,242 | 8/1962 | Perks | 188—18 X |

FOREIGN PATENTS 551,274  11/1956  Italy.

MILTON BUCHLER, *Primary Examiner.*

B. S. MOWRY, T. W. BUCKMAN, *Assistant Examiners.*